United States Patent
Ojima et al.

(10) Patent No.: US 10,710,242 B2
(45) Date of Patent: Jul. 14, 2020

(54) CONTROLLER, CONTROL SYSTEM, AND CONTROL METHOD

(71) Applicant: Kabushiki Kaisha Yaskawa Denki, Kitakyushu-shi, Fukuoka (JP)

(72) Inventors: Masao Ojima, Fukuoka (JP); Kanji Takanishi, Fukuoka (JP)

(*) Notice: Subject to any disclaimer, the term of this patent is extended or adjusted under 35 U.S.C. 154(b) by 182 days.

(21) Appl. No.: 15/921,581

(22) Filed: Mar. 14, 2018

(65) Prior Publication Data

US 2018/0264650 A1    Sep. 20, 2018

(30) Foreign Application Priority Data

Mar. 16, 2017  (JP) ................................ 2017-051285

(51) Int. Cl.
  *B25J 9/16* (2006.01)
  *B25J 9/00* (2006.01)
  *G05B 19/418* (2006.01)

(52) U.S. Cl.
  CPC ........... *B25J 9/1669* (2013.01); *B25J 9/0096* (2013.01); *G05B 19/4182* (2013.01); *G05B 2219/2214* (2013.01); *G05B 2219/33097* (2013.01); *G05B 2219/39101* (2013.01); *Y02P 90/08* (2015.11); *Y10S 901/15* (2013.01); *Y10S 901/23* (2013.01)

(58) Field of Classification Search
  None
  See application file for complete search history.

(56) References Cited

U.S. PATENT DOCUMENTS

| 5,252,900 | A | 10/1993 | Uehara et al. |
| 5,517,097 | A | 5/1996 | Hayashida |
| 2010/0191365 | A1 | 7/2010 | Yonezu et al. |

FOREIGN PATENT DOCUMENTS

| JP | S63-282502 | 11/1988 |
| JP | H3-204008 | 9/1991 |
| JP | H7-072911 | 3/1995 |
| JP | 2003-330510 | 11/2003 |
| JP | 2007-226492 | 9/2007 |
| JP | 2009-009409 | 1/2009 |
| JP | 2010-176375 | 8/2010 |
| JP | 2013-226602 | 11/2013 |

OTHER PUBLICATIONS

Extended Search Report in corresponding European Application No. 18161681.4, dated Nov. 19, 2018.
Office Action issued in Japanese Patent Application No. P2017-051285, dated Jan. 14, 2020 (with English partial translation).

*Primary Examiner* — Carlos R Ortiz Rodriguez
(74) *Attorney, Agent, or Firm* — Soei Patent & Law Firm

(57) ABSTRACT

The control system includes a first controller, a second controller, and a third controller. The third controller includes a first communication module, a second communication module, and a control processing module configured to output a first operation command for operating the first controlled object to the first controller via the first communication module, configured to output a second operation command for operating the second controlled object to the second controller via the second communication module, configured to switch a mode between a normal control mode and a synchronous control mode, and configured to output, to the second controller via the second communication module, a command to decrease the second gain during at least part of a period of the synchronous control mode as compared with the normal control mode.

20 Claims, 6 Drawing Sheets

CONTROLLER, CONTROL SYSTEM, AND CONTROL METHOD

CROSS-REFERENCE TO RELATED APPLICATION

This application is based upon and claims the benefit of priority from Japanese Patent Application No. 2017-051285, filed on Mar. 16, 2017, the entire contents of which are incorporated herein by reference.

BACKGROUND

1. Field

The present disclosure relates to a controller, a control system, and a control method.

2. Description of the Related Art

Japanese Unexamined Patent Publication No. H07-72911 discloses a control method in which it is determined whether the operation mode of the first axis is a normal operation mode or a position synchronous operation mode in which the position synchronization between the first axis and the other axis is established, and when it is determined that the operation mode is the position synchronous operation mode, a transfer function model of the first axis and the other axis is inserted with respect to the position command output to the other axis.

SUMMARY

A control system according to one or more example embodiments of the present disclosure includes a first controller configured to control a first controlled object with a first gain, a second controller configured to control a second controlled object having higher responsiveness than the first controlled object with a second gain, and a third controller configured to operate the first controlled object via the first controller and configured to operate the second controlled object via the second controller. The third controller includes a first communication module configured to input and output information to and from the first controller, a second communication module configured to input and output information to and from the second controller, and a control processing module configured to output a first operation command for operating the first controlled object to the first controller via the first communication module, configured to output a second operation command for operating the second controlled object to the second controller via the second communication module, configured to switch a mode between a normal control mode and a synchronous control mode, and configured to output, to the second controller via the second communication module, a command to decrease the second gain during at least part of a period of the synchronous control mode as compared with the normal control mode.

A controller according to one or more example embodiments of the present disclosure includes a first communication module configured to input and output information to and from a first controller configured to control a first controlled object with a first gain, a second communication module configured to input and output information to and from a second controller configured to control a second controlled object having higher responsiveness than the first controlled object with a second gain, and a control processing module configured to output a first operation command for operating the first controlled object to the first controller via the first communication module, configured to output a second operation command for operating the second controlled object to the second controller via the second communication module, configured to switch a mode between a normal control mode and a synchronous control mode, and configured to output, to the second controller via the second communication module, a command to decrease the second gain during at least part of a period of the synchronous control mode as compared with the normal control mode.

A control method according to one or more example embodiments of the present disclosure is performed by a third controller configured to operate a first controlled object via a first controller configured to control the first controlled object with a first gain, and configured to operate a second controlled object via a second controller that controls the second controlled object having higher responsiveness than the first controlled object with a second gain, and the control method includes outputting a first operation command for operating the first controlled object to the first controller, outputting a second operation command for operating the second controlled object to the second controller, switching a mode between a normal control mode and a synchronous control mode, and outputting to the second controller a command to decrease the second gain during at least part of a period of the synchronous control mode as compared with the normal control mode.

DETAILED DESCRIPTION

Figure 1:
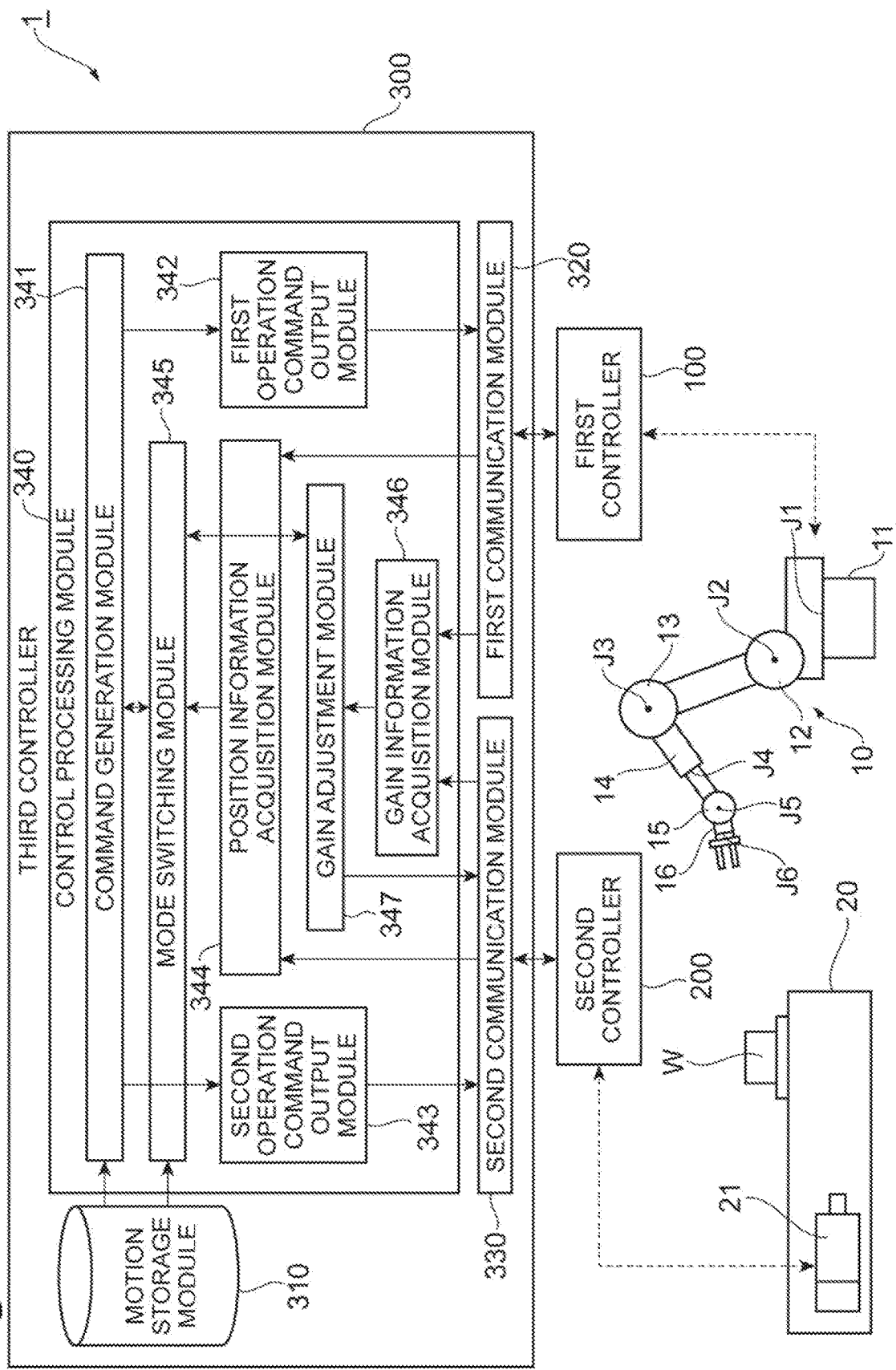
FIG. 1 is a block diagram showing a functional configuration of a control system, according to one or more example embodiments.

Hereinafter, example embodiments will be described in detail with reference to the drawings. Note that in the description, elements having the same element or the same function are denoted by the same reference numerals, and duplicate explanation is omitted.

[Control System]

The control system 1 according to an example embodiment controls a plurality of types of controlled objects having different timing characteristics, such as responsiveness for example, while synchronizing them as necessary, in order for the controlled objects to operate collaboratively. As shown in FIG. 1, the plurality of controlled objects includes a first controlled object and a second controlled object associated with a first timing characteristic. For example, the second controlled object may have a higher responsiveness than the first controlled object.

In one or more embodiments, the first controlled object and the second controlled object may be of any type as long as the condition that the responsiveness of the second controlled object is higher than the responsiveness of the first controlled object is satisfied. Responsiveness means the speed at which a target value is achieved upon the controlled object receiving a command. That is to say, the first controlled object has a first response speed (as a first timing characteristic) and the second controlled object has a second response speed (as a first timing characteristic) that is higher, i.e. faster, than the first response speed. The second controlled object is capable of operating collaboratively with the first controlled object. For example, the first controlled object is a multi-axis robot 10, and the second controlled object is a peripheral device 20 that is cooperatively operable with the multi-axis robot 10, by holding and moving a workpiece W that is a job target of the multi-axis robot 10.

The multi-axis robot 10 is, for example, a vertically articulated robot having serially linked joints, and includes a plurality (for example, six axes) of joint axes J1 to J6 and a plurality of actuators 11 to 16 for driving the respective joint axes J1 to J6.

The peripheral device 20 includes an actuator, for example, a servomotor 21, and operates by using the servomotor 21 as a power source. Although only one servomotor 21 is depicted in FIG. 1, the peripheral device 20 may include a plurality of servomotors 21. For example, the peripheral device 20 may include a turntable for holding the workpiece W and a linear motion shaft for moving the turntable, and may include two servomotors 21 for each driving the turntable and the linear motion shaft. In other words, the peripheral device 20 may have one or more motion axes that are associated with the servomotors 21. The number of the motion axes may be smaller than the number of the joint axes J1 to J6 of the multi-axis robot 10.

For example, the control system 1 controls the peripheral device 20 so as to hold the workpiece W on the turntable at a predetermined delivery location away from the multi-axis robot 10. Next, a first controller 100 controls the peripheral device 20 so as to drive the linear motion shaft to move the turntable to the working range of the multi-axis robot 10, and controls the multi-axis robot 10 so that the multi-axis robot 10 performs a job of handling the workpiece W. Examples of the job of handling the workpiece W performed by the multi-axis robot 10 include arc welding, assembly, and the like. At this time, the control system 1 controls the peripheral device 20 so as to drive at least one of the turntable and the linear motion shaft in cooperation with the job performed by the multi-axis robot 10 to adjust the position and attitude of the workpiece. When the job performed by the multi-axis robot 10 is completed, the control system 1 controls the peripheral device 20 so as to drive the linear motion shaft to return the turntable to the delivery place, and so as to hold another workpiece for which the job is newly performed on the turntable instead of the workpiece W for which the job has been completed. Thereafter, the control system 1 repeats the above-described series of control.

Here, in general, responsiveness of the controlled object can be made higher if the controlled object has smaller inertia and higher rigidity. In the example of the present embodiment, the operation of the peripheral device 20 is simpler than that of the multi-axis robot 10, and the peripheral device 20 can employ a structure with small inertia and high rigidity, thereby having higher responsiveness than that of the multi-axis robot 10. For this reason, if the multi-axis robot 10 and the peripheral device 20 are controlled with the responsiveness delay ignored, the operation timings of the multi-axis robot 10 and the peripheral device 20 are shifted.

Therefore, the control system 1 switches a mode between the normal control mode and the synchronous control mode. As compared with the normal control mode, the synchronous control mode is a control mode for decreasing the shift of the operation timings (or timing offset) between the multi-axis robot 10 and the peripheral device 20. For example, the control system 1 sets the control mode to the synchronous control mode when controlling the peripheral device 20 so as to adjust the position and attitude of the workpiece in cooperation with the job performed by the multi-axis robot 10, and sets the synchronous control mode to the normal control mode when controlling the peripheral device 20 so as to move the workpiece W to and from the working range of the multi-axis robot 10. The shift of operation timings (or timing offset) may be caused for example, by differences in timing characteristics, such as data processing speeds for controlling the first and second controlled objects, and/or responsiveness of the first and second controlled objects. For example, responsiveness may be due to mechanical properties, such as the number of motors or the speed of motors operating the first or second controlled objects, the range of motion of components of the first or second controlled objects, etc. Alternatively, responsiveness may be due to processing speed of the first or second controlled objects. For example, the first controlled object may require a first response delay between receiving a command and carrying out an operation in response to the command, while the second controlled object may require a second response delay between receiving a command and carrying out an operation in response to the command. In addition, a processing time for the processing device to generate the first operation command and for the processing device to generate the second operation command may differ. Thus, a timing offset may occur when the first and second response delays are different.

Hereinafter, a specific configuration of the control system 1 will be described. The control system 1 includes the first controller 100 configured to control the first controlled object with a first gain, a second controller 200 configured to control the second controlled object having higher responsiveness than the first controlled object with a second gain, and a third controller 300 configured to operate the first controlled object via the first controller 100 and configured to operate the second controlled object via the second controller 200.

The first gain is a numerical value for adjusting the responsiveness of the first controlled object via the first operation command. The first gain may be representative, for example, of an increase of power to supply to the first controlled object or a component thereof (such as one or more motors of the first controlled object). Thus the responsiveness of the first controlled object increases as the first gain increases. The second gain is a numerical value for adjusting the responsiveness of the second controlled object via the second operation command. The second gain may be representative, for example, of an increase of power to supply to the second controlled object or a component thereof (such as one or more motors of the second controlled object). Thus, the responsiveness of the second controlled object increases as the second gain increases. Responsiveness means the speed at which the target value is followed. A specific example of the first gain and the second gain is a proportional gain in proportional control.

The third controller 300 is, for example, a machine controller, and outputs an operation command (for example, a control signal including a target value to reach, i.e. a value representing a target position, attitude and/or the like) to the first controller 100 and the second controller 200 at a predetermined control cycle. The third controller 300 includes a motion storage module 310, a first communication module 320, a second communication module 330, and a control processing module 340 as a functional configuration (hereinafter referred to as "functional module").

The motion storage module 310 stores information defining the operation content of the multi-axis robot 10 and the peripheral device 20 (hereinafter referred to as "motion information"). The motion information includes, for example, a list in which operation commands to be output to the multi-axis robot 10 and the peripheral device 20 are arranged in chronological order, a flag attached to an operation command corresponding to a switching start position from the normal control mode to the synchronous control mode (hereinafter referred to as "first flag"), a flag attached to an operation command corresponding to the switching completion position from the normal control mode to the synchronous control mode (hereinafter referred to as "second flag"), and a flag attached to an operation command corresponding to the switching start position from the synchronous control mode to the normal control mode (hereinafter referred to as "third flag"). That is to say, the motion information indicates a sequential operation of the first and second controllers, for example a sequential list of operation commands for the first and second controllers as well as the above-mentioned flags in association with timing information.

Figure 2:
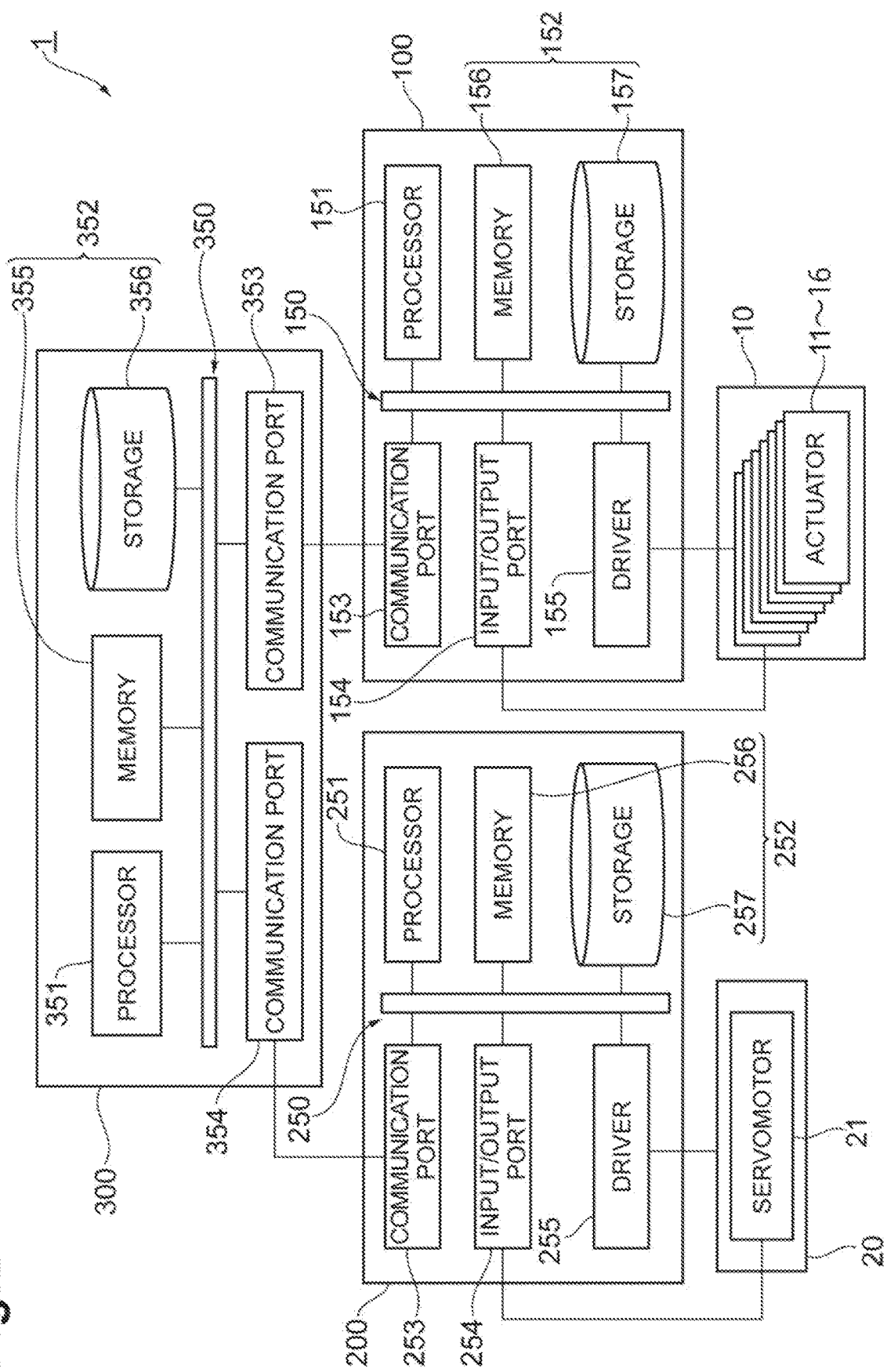
FIG. 2 is a block diagram showing a hardware configuration of an example control system.

The first communication module 320 inputs and outputs information to and from the first controller 100. The first communication module 320 may comprise a first communication device, for example a communication port 353 (FIG. 2). The second communication module 330 inputs and outputs information to and from the second controller 200. The second communication module 320 may comprise a second communication device, for example a communication port 354 (FIG. 2).

The control processing module 340 is configured to repeat a number of control cycles, each comprising outputting the first operation command to the first controller 100 via the first communication module 320 in order to operate the multi-axis robot 10, outputting the second operation command to the second controller 200 via the second communication module 330 in order to operate the peripheral device 20, switching a mode between the normal control mode and the synchronous control mode (where the normal control mode is associated with a normal mode gain, and the synchronous control mode is associated with a synchronous mode gain that is lower than the normal mode gain), and outputting, to the second controller 200 via the second communication module 330, a gain adjustment command to set the second gain to the synchronous mode gain during at least part of a period of the synchronous control mode. The first controlled object is associated with a first timing characteristic and the second controlled object is associated with a second timing characteristic that is different from the first timing characteristic which creates a timing offset. The gain adjustment command allows to correct the timing offset, with a suitable level of tolerance. In the normal control mode, the control processing module 340 may set the second gain to a normal mode gain. In the synchronous control mode, the control processing module 340 may set the second gain to a synchronous mode gain. The synchronous mode gain may be lower than the normal mode gain.

The control processing module 340 may further be configured to acquire information on a current position of the multi-axis robot 10 from the first controller 100 via the first communication module 320, and configured to acquire information on a current position of the peripheral device 20 from the second controller 200 via the second communication module 330. Switching a mode between the normal control mode and the synchronous control mode may include switching the normal control mode to the synchronous control mode in a state in which both the current position of the multi-axis robot 10 and the current position of the peripheral device 20 satisfy a switching condition (also referred to herein as a "first switching condition"), and outputting to the second controller 200 a gain adjustment command to set the second gain to the synchronous mode gain during at least part of a period of the synchronous control mode (also referred to herein as "outputting to the second controller 200 a command to decrease the second gain during at least part of a period of the synchronous control mode as compared with the normal control mode") may include outputting to the second controller 200 a command to decrease the second gain in synchronization with a switching of the normal control mode to the synchronous control mode.

Outputting to the second controller 200 a command to decrease the second gain in synchronization with switching of the normal control mode to the synchronous control mode may include outputting to the second controller 200 a command to gradually decrease the second gain as the current position of the multi-axis robot 10 approaches the position satisfying the switching condition, and completing the output of the command to decrease the second gain when or before the current position of the multi-axis robot 10 reaches the position satisfying the switching condition. That is to say, the gain adjustment command to be outputted to the second controller may comprise a gradual decrease command to gradually decrease the second gain as the current position of the second controlled object approaches a position satisfying the first switching condition, wherein the output of the gradual decrease command is completed when or before the current position of the second controlled object reaches the position satisfying the first switching condition.

The control processing module 340 may further be configured to acquire information indicating the first gain from the first controller 100 via the first communication module 320, and configured to set a degree of the decrease in the second gain based on the first gain, and outputting a command to decrease the second gain to the second controller 200 may include outputting to the second controller 200 a command to decrease the second gain according to the degree of the decrease.

For example, the control processing module 340 includes a command generation module 341, a first operation command output module 342, a second operation command output module 343, a position information acquisition module 344, a mode switching module 345, a gain information acquisition module 346, and a gain adjustment module 347 as further divided functional modules. The control processing module 340 may comprise a processing device, for example, a processor 351 (FIG. 2).

The command generation module 341 generates the first operation command and the second operation command for each control cycle based on the motion information stored in the motion storage module 310. The motion storage module may be associated with a storage device, for example the memory 355 and/or storage device 356 (FIG. 2). The first operation command includes, for example, numerical data that sets a positional target value (e.g. target position, target attitude and/or the like) of the first controlled object. In this example, the positional target value sets a position/attitude target value of the tip portion of the multi-axis robot 10. The second operation command is, for example, numerical data that sets a positional target value (e.g. target position, target angle and/or the like) of the second controlled object. In this example, the positional target value sets an angle target value of the servomotor 21 of the peripheral device 20. In one or more embodiments, the motion information is in a table format (or database) and comprises timing values sequenced in chronological order, and a first value and second value associated with each of the timing values. In addition, a control mode (the normal control mode or the synchronous control mode) is associated with each of the timing values. The first values may be values to be output as the first operation command and the second values may be values to be output as the second operation command. By following the information stored in the table, the first operation command and the second operation command may be output depending on the timing values. The first values and the second values may comprise positional information (such as a position, an angle, an attitude, etc.). Accordingly, the first or second operation command signals the first or second controlled object to achieve the positioning (e.g. position, angle, attitude, etc) specified in the positional information. In some cases, a timing offset may occur as mentioned above, for example, when the first value output as the first operation command and the second value output as the second operation command are associated with different timing values in the table of the motion information. When such a timing offset occurs, in the synchronous control mode, the second operation command may be corrected so that the first and second operations commands are correlated with the same timing value in the table. For example, a first value may be selected among the first values in the table (as a selected first value) based on the information on the current position of the first controlled object, and the second operation command may then be corrected to correspond to the second value, that is correlated with the selected first value in the table of the motion information.

The first operation command output module 342 outputs the first operation command to the first controller 100 via the first communication module 320. The second operation command output module 343 outputs the second operation command to the second controller 200 via the second communication module 330.

The position information acquisition module 344 acquires information on the current position of the multi-axis robot 10 from the first controller 100 via the first communication module 320, and information on the current position of the peripheral device 20 from the second controller 200 via the second communication module 330. Note that the current position means a position at the time of sensing the information for specifying the current position. The current position may include a position, attitude and/or the like of the multi-axis robot 10 or a component thereof (for example, the current angle of the joint axes J1 to J6 and the servomotor 21).

The mode switching module 345 switches a mode between the normal control mode and the synchronous control mode. For example, the mode switching module 345 switches the normal control mode to the synchronous control mode when both the current position of the multi-axis robot 10 and the current position of the peripheral device 20 satisfy the switching condition from the normal control mode to the synchronous control mode, and switches the synchronous control mode to the normal control mode when or after both the current position of the multi-axis robot 10 and the current position of the peripheral device 20 satisfy the switching condition from the synchronous control mode to the normal control mode. Satisfying the switching condition includes, for example, matching with a first switching positioning for the first controlled object and/or with a second switching positioning for the second controlled object. The first switching positioning and/or the second switching positioning for the first switching condition may be preset, determined dynamically, inputted from another device/system and/or the like. The first switching positioning and/or the second switching positioning may comprise data on the position (e.g., spatial position), the attitude (e.g., angular position with respect to one or more axes), and/or the like of the first controlled object and/or the second controlled object. For example, the first switching positioning may indicate the position and attitude of a particular component of the first controlled object. "Match" here includes a state in which a difference between the (first or second) switching positioning, and the actual positioning of the (first or second) controlled object remains within a suitable tolerance level (negligible level).

The gain information acquisition module 346 acquires information indicating the first gain from the first controller 100 via the first communication module 320, and information indicating the second gain from the second controller 200 via the second communication module 330.

The gain adjustment module 347 sets a degree of the decrease in the second gain based on the first gain, and outputs a command to decrease the second gain according to the degree of the decrease to the second controller 200 via the second communication module 330 in synchronization with switching of the normal control mode to the synchronous control mode.

When outputting to the second controller 200 a command to decrease the second gain in synchronization with switching of the normal control mode to the synchronous control mode, the gain adjustment module 347 outputs a command to gradually decrease the second gain to the second controller 200 as the current position of the multi-axis robot 10 approaches the position satisfying the switching condition, and completes the output of the command to decrease the second gain when or before the current position of the multi-axis robot 10 reaches the position satisfying the switching condition.

In addition, the gain adjustment module 347 outputs a command to return the second gain to the value before the decrease to the second controller 200 via the second communication module 330 in synchronization with switching of the synchronous control mode to the normal control mode. When outputting to the second controller 200 a command to return the second gain to the value before the decrease in synchronization with switching of the synchronous control mode to the normal control mode, the gain adjustment module 347 outputs to the second controller 200 a command to gradually increase the second gain when or after both the current position of the multi-axis robot 10 and the current position of the peripheral device 20 satisfy the switching condition (also referred to herein as a "second switching condition") from the synchronous control mode to the normal control mode, and completes the increase in the second gain when the second gain returns to the value before the decrease. For example, switching the mode may comprise switching the mode from the synchronous control mode to the normal control mode when both the current position of the first controlled object and the current position of the second controlled object satisfy the second switching condition, and the gain adjustment command to be outputted to the second controller may comprise a command to increase the second gain in accordance with a timing at which the processing device switches the mode from the synchronous control mode to the normal control mode. In some embodiments, the first operation command and the second operation command may be maintained until both the current position of the first controlled object and the current position of the second controlled object satisfy the second switching condition. Satisfying the second switching condition includes, for example, matching with a first switching positioning for the first controlled object and/or with a second switching positioning for the second controlled object. "Match" or "matching" exists when a difference between the (first or second) switching positioning, and the actual positioning of the (first or second) controlled object remains within a suitable tolerance level (negligible level). The first switching positioning and/or the second switching positioning for the second switching condition may be preset, determined dynamically, inputted from another device/system and/or the like. The first switching positioning and/or the second switching positioning may comprise data on the position (e.g., spatial position), the attitude (e.g., angular position with respect to one or more axes), and/or the like of the first controlled object and/or the second controlled object. For example, the first switching positioning may indicate the position and attitude of a particular component of the first controlled object.

The first controller 100 is, for example, a robot controller, and controls the actuators 11 to 16 with the first gain so as to operate the multi-axis robot 10 in accordance with the first operation command output from the third controller 300.

The second controller 200 is, for example, a servo controller, and controls the servomotor 21 with the second gain so as to operate the peripheral device 20 in accordance with the second operation command output from the second controller 200.

FIG. 2 is a block diagram showing an example of a hardware configuration of a control system 1. As shown in FIG. 2, the third controller 300 includes a circuit 350. The circuit 350 includes one or more processors 351, a storage module 352, and communication ports 353 and 354.

The storage module 352 includes a memory 355 and a storage 356. The storage 356 functions as the motion storage module 310 and records a program used to configure each functional module of the control processing module 340. The storage 356 may be any unit as long as it is computer readable. Specific examples of the storage 356 include a hard disk, a nonvolatile semiconductor memory, a magnetic disk, an optical disk, and the like. The memory 355 temporarily stores the program loaded from the storage 356, the calculation result by a processor 351, and the like. The processor 351 executes programs in cooperation with the memory 355, thereby constituting each functional module of the control processing module 340. That is, the processor 351 functions as the control processing module 340.

The communication port 353 performs information communication (for example, high-speed serial communication) with a communication port 153 (described later) of the first controller 100 in accordance with a command from the processor 351. The communication port 353 functions as the first communication module 320. The communication port 354 performs information communication (for example, high-speed serial communication) with a communication port 253 (described later) of the second controller 200 in accordance with a command from the processor 351. The communication port 354 functions as the second communication module 330.

The first controller 100 includes a circuit 150. The circuit 150 includes one or more processors 151, a storage module 152 (including the memory 156 and the storage device 157), the communication port 153, an input/output port 154, and a driver 155.

The storage module 152 includes a memory 156 and a storage 157. The storage 157 records a program configuring one or more functional modules to be executed by the processor 151 of the first controller 100. The storage 157 may be any unit as long as it is computer readable. Specific examples of the storage 157 include a hard disk, a nonvolatile semiconductor memory, a magnetic disk, an optical disk, and the like. The memory 156 temporarily stores the program loaded from the storage 157, the calculation result by a processor 151, and the like. The processor 151 executes programs in cooperation with the memory 156, thereby constituting each functional module to be executed by the processor 151.

The communication port 153 performs information communication with the communication port 353 of the third controller 300 in accordance with a command from the processor 151. The communication port 153 functions as a communication module of the first controller 100. The input/output port 154 acquires electric signals indicating the angles of the joint axes J1 to J6 from the actuators 11 to 16 in accordance with a command from the processor 151. The driver 155 outputs driving power to the actuators 11 to 16 in accordance with a command from the processor 151.

The second controller 200 includes a circuit 250. The circuit 250 includes one or more processors 251, a storage module 252, the communication port 253, an input/output port 254, and a driver 255.

The storage module 252 includes a memory 256 and a storage 257. The storage 257 records a program for controlling the peripheral device 20. The storage 257 may be any unit as long as it is computer readable. Specific examples of the storage 257 include a hard disk, a nonvolatile semiconductor memory, a magnetic disk, an optical disk, and the like. The memory 256 temporarily stores the program loaded from the storage 257, the calculation result by the processor 251, and the like. The processor 251 executes a program in cooperation with the memory 256, thereby executing control of the peripheral device 20 in accordance with the second operation command.

The communication port 253 performs information communication with the communication port 354 of the third controller 300 in accordance with a command from the processor 251. The input/output port 254 acquires an electric signal indicating the rotation angle of the servomotor 21 in accordance with a command from the processor 251. The driver 255 outputs driving power to the servomotor 21 in accordance with a command from the processor 251.

The hardware configuration of any of the controller 100, 200, and 300 is not necessarily limited to the configuration that constitutes each functional block by a program. For example, at least part of the functional modules of any of the controllers 100, 200, and 300 may be constituted by a dedicated logic circuit or an ASIC (Application Specific Integrated Circuit) in which the dedicated logic circuits are integrated.

[Control Method]

Next, as an example of the control method, the control processing procedure performed by the third controller will be described.

(Control Procedure of Third Controller in Normal Control Mode)

Figure 3:
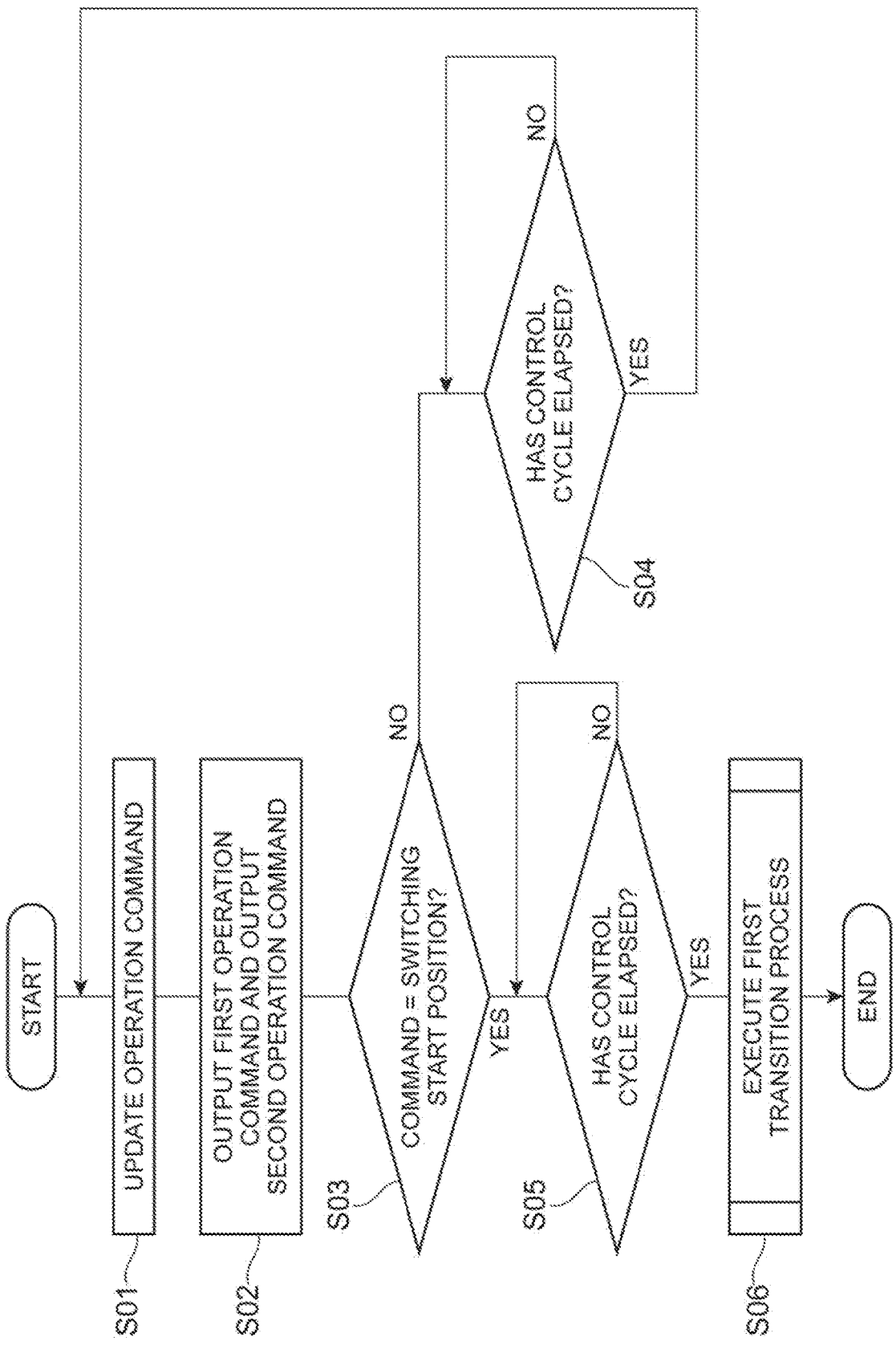
FIG. 3 is a flowchart showing a control procedure of an example third controller in a normal control mode.

In some example embodiments, the third controller 300 may be configured to sequentially execute some or all of the steps illustrated in FIG. 3 and as further described below. Whereas some of the steps may additionally be described as being executed by one or more "modules," in some example embodiments some or all of the steps may be performed by one or more processing devices and/or hardware devices, and as further described above with respect to the example hardware configuration illustrated in FIG. 2. In step S01, the command generation module 341 generates a first operation command and a second operation command in the current control cycle based on the motion information stored in the motion storage module 310.

In step S02, the first operation command output module 342 outputs the first operation command generated by the command generation module 341 to the first controller 100 via the first communication module 320, and the second operation command output module 343 outputs the second operation command generated by the command generation module 341 to the second controller 200 via the second communication module 330.

In step S03, the mode switching module 345 checks whether the first operation command and the second operation command correspond to the switching start position from the normal control mode to the synchronous control mode. For example, the mode switching module 345 refers to the motion storage module 310 and checks whether the first flag is attached to the first operation command and the second operation command.

In response to determining in step S03 that the first operation command and the second operation command do not correspond to the switching start position from the normal control mode to the synchronous control mode, the process proceeds to step S04, and the command generation module 341 waits for the elapse of the control cycle. The process may return to step S01. Updating and outputting of the operation command are repeated until the first operation command and the second operation command correspond to the switching start position from the normal control mode to the synchronous control mode.

In response to determining in step S03 that the first operation command and the second operation command correspond to the switching start position from the normal control mode to the synchronous control mode, the process proceeds to step S05, and the mode switching module 345 waits for the elapse of the control cycle.

Step S06 includes first transition processing for shifting the normal control mode to the synchronous control mode.

Figure 4:
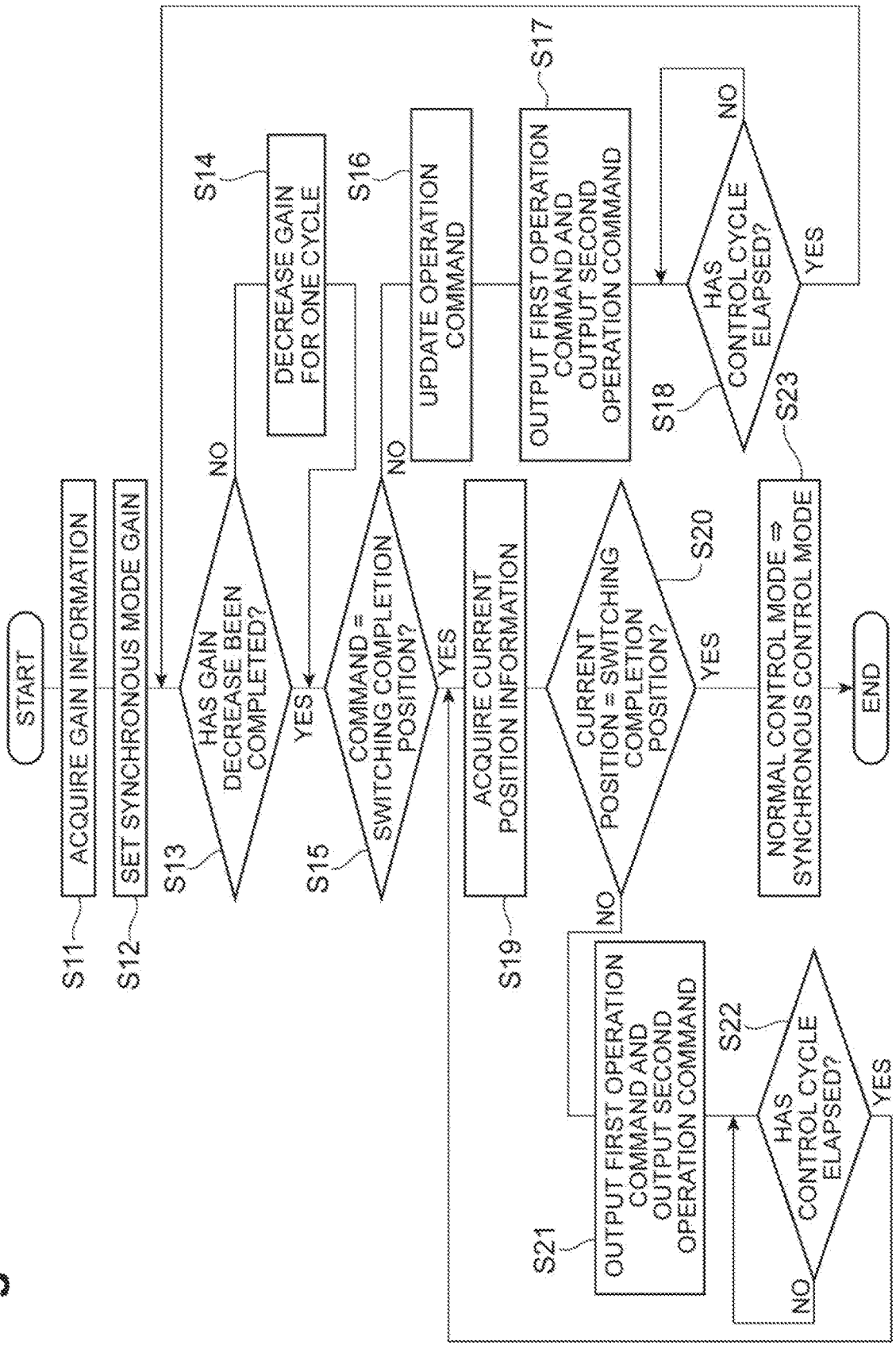
FIG. 4 is a flowchart showing an example first transition processing procedure.

FIG. 4 is a flowchart showing the first transition processing procedure. In some example embodiments, the third controller 300 may be configured to sequentially execute some or all of the steps illustrated in FIG. 4 and as further described below. Whereas some of the steps may additionally be described as being executed by one or more "modules," in some example embodiments some or all of the steps may be performed by one or more processing devices and/or hardware devices, and as further described above with respect to the example hardware configuration illustrated in FIG. 2. In step S11, the gain information acquisition module 346 acquires information indicating the first gain from the second controller 200 via the first communication module 320, and information indicating the second gain from the third controller 300 via the second communication module 330.

In step S12, the gain adjustment module 347 sets a degree of the decrease in the second gain based on the first gain. The gain adjustment module 347 may set the second gain after completion of the decrease (hereinafter referred to as "decreasing target gain"), and may set the second gain decreasing rate from before the start of the decrease to completion of the decrease (hereinafter referred to as "target decreasing rate"). For example, the gain adjustment module 347 may set the value of the first gain to the value of the second gain after completion of the decrease. Further, a value obtained by dividing the first gain by the second gain may be set as the second gain decreasing rate.

In step S13, the gain adjustment module 347 checks whether the decrease in the second gain has been completed. In step S12, in a case where the decreasing target gain is set, the gain adjustment module 347 checks whether the current second gain is the decreasing target gain. In a case where the target decreasing rate is set in step S12, the gain adjustment module 347 checks whether a value obtained by dividing the current second gain by the second gain before the start of the decrease is the target decreasing rate.

In response to determining in step S13 that the decrease in the second gain is not completed, the process proceeds to step S14, and the gain adjustment module 347 outputs a command to decrease the second gain with a decreasing pitch for one cycle or a decreasing rate for one cycle to the second controller 200 via the second communication module 330. The decreasing pitch for one cycle or the decreasing rate for one cycle is preset so as to complete the decrease in the second gain before the first operation command and the second operation command correspond to the switching completion position from the normal control mode to the synchronous control mode.

In step S15, the mode switching module 345 checks whether the first operation command and the second operation command correspond to the switching completion position from the normal control mode to the synchronous control mode. For example, the mode switching module 345 refers to the motion storage module 310 and checks whether the second flag is attached to the first operation command and the second operation command.

In response to determining in step S15 that the first operation command and the second operation command do not correspond to the switching completion position from the normal control mode to the synchronous control mode, the process proceeds to step S16, and the command generation module 341 generates the first operation command and the second operation command in the current control cycle based on the motion information stored in the motion storage module 310.

In step S17, the first operation command output module 342 outputs the first operation command generated by the command generation module 341 to the first controller 100 via the first communication module 320, and the second operation command output module 343 outputs the second operation command generated by the command generation module 341 to the second controller 200 via the second communication module 330.

In step S18, the command generation module 341 waits for the elapse of the control cycle. Thereafter, the third controller 300 returns the process to step S03. Thereafter, until the decrease in the second gain is completed, decreasing the second gain with the decreasing pitch for one cycle or the decreasing rate for one cycle, and updating and outputting of the operation command are repeated. Thereafter, updating and outputting of the operation command are repeated until the first operation command and the second operation command correspond to the switching completion position from the normal control mode to the synchronous control mode. Decreasing the second gain with the decreasing pitch for one cycle or the decreasing rate for one cycle is repeated, whereby the second gain gradually decreases. As exemplified herein, gradually decreasing includes decreasing in stages with multiple iterations.

In response to determining in step S15 that the first operation command and the second operation command correspond to the switching completion position from the normal control mode to the synchronous control mode, the process proceeds to step S19, and the position information acquisition module 344 acquires information on the current position of the multi-axis robot 10 from the first controller 100 via the first communication module 320, and information on the current position of the peripheral device 20 from the second controller 200 via the second communication module 330.

In step S20, the mode switching module 345 checks whether the current position of the multi-axis robot 10 and the current position of the peripheral device 20 agree with the switching completion positions from the normal control mode to the synchronous control mode. That is, the mode switching module 345 checks whether the current position of the multi-axis robot 10 matches the first operation command, and the current position of the peripheral device 20 matches the second operation command. Note that "match" here includes a state in which a difference of a tolerance level (negligible level) remains.

In response to determining in step S20 that the current position of the multi-axis robot 10 and the current position of the peripheral device 20 do not agree with the switching completion positions from the normal control mode to the synchronous control mode, the process proceeds to step S21, and the first operation command output module 342 outputs the first operation command to the first controller 100 via the first communication module 320, and the second operation command output module 343 outputs the second operation command to the second controller 200 via the second communication module 330.

In step S22, the mode switching module 345 waits for the elapse of the control cycle. Thereafter, the third controller 300 returns the process to step S19. Thereafter, until the current position of the multi-axis robot 10 and the current position of the peripheral device 20 agree with the switching completion positions from the normal control mode to the synchronous control mode, the output of the constant operation command is repeated.

In response to determining in step S20 that the current position of the multi-axis robot 10 and the current position of the peripheral device 20 agree with the switching completion positions from the normal control mode to the synchronous control mode, the process proceeds to step S23, and the mode switching module 345 switches the normal control mode to the synchronous control mode. This concludes the first transition processing.

(Control Procedure of Third Controller in Synchronous Control Mode)

Figure 5:
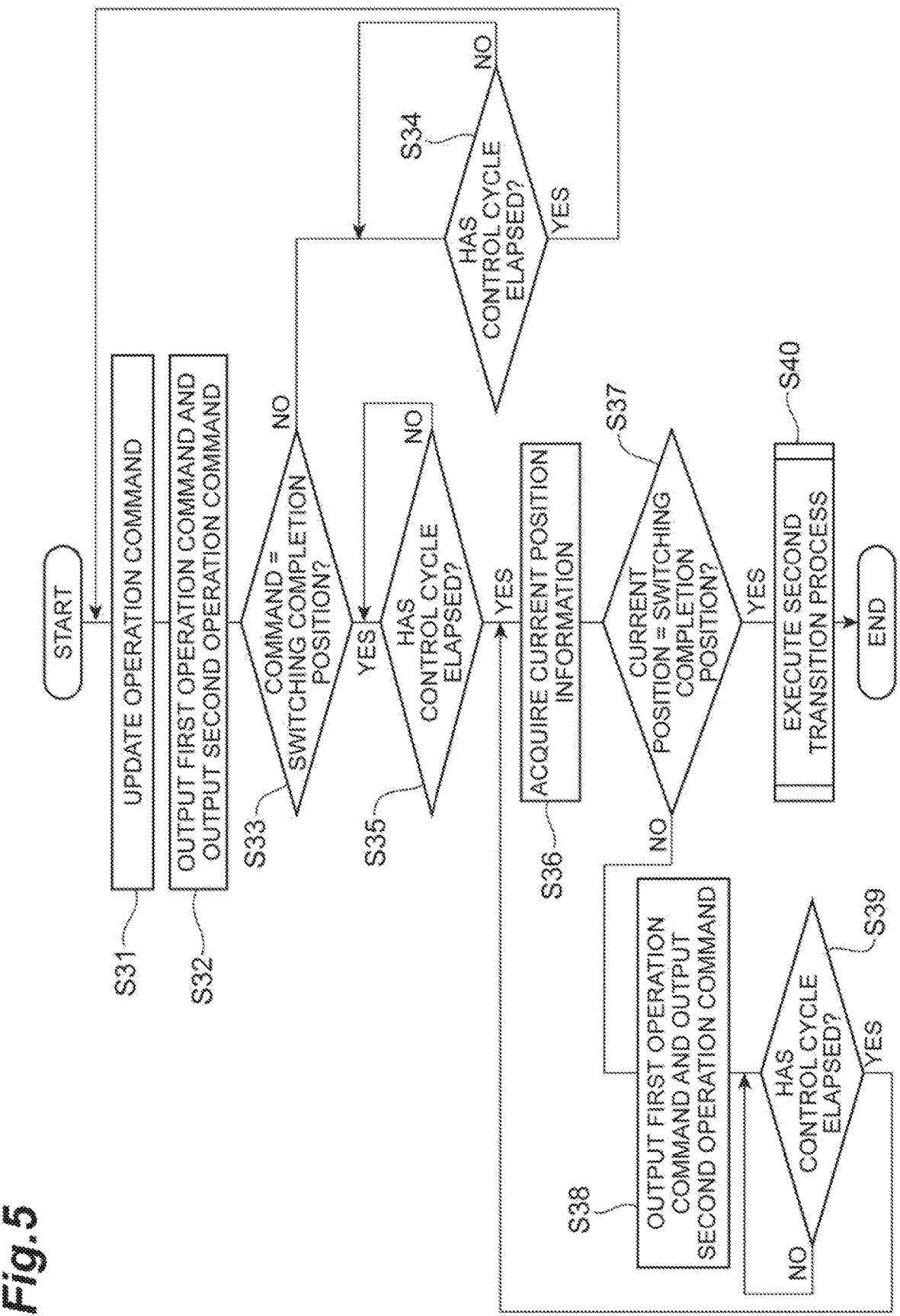
FIG. 5 is a flowchart showing an example control procedure of the third controller in a synchronous control mode.

In some example embodiments, the third controller 300 may be configured to sequentially execute some or all of the steps illustrated in FIG. 5 and as further described below. Whereas some of the steps may additionally be described as being executed by one or more "modules," in some example embodiments some or all of the steps may be performed by one or more processing devices and/or hardware devices, and as further described above with respect to the example hardware configuration illustrated in FIG. 2. In step S31, the command generation module 341 generates the first operation command and the second operation command in the current control cycle based on the motion information stored in the motion storage module 310.

In step S32, the first operation command output module 342 outputs the first operation command generated by the command generation module 341 to the first controller 100 via the first communication module 320, and the second operation command output module 343 outputs the second operation command generated by the command generation module 341 to the second controller 200 via the second communication module 330.

In step S33, the mode switching module 345 checks whether the first operation command and the second operation command correspond to the switching start position from the synchronous control mode to the normal control mode. For example, the mode switching module 345 refers to the motion storage module 310 and checks whether the third flag is attached to the first operation command and the second operation command.

In response to determining in step S33 that the first operation command and the second operation command do not correspond to the switching start position from the synchronous control mode to the normal control mode, the process proceeds to step S34, and the command generation module 341 waits for the elapse of the control cycle. Thereafter, the third controller 300 returns the process to step S31. Thereafter, updating and outputting of the operation command are repeated until the first operation command and the second operation command correspond to the switching start position from the synchronous control mode to the normal control mode.

In response to determining in step S33 that the first operation command and the second operation command correspond to the switching start position from the synchronous control mode to the normal control mode, the process proceeds to step S35, and the mode switching module 345 waits for the elapse of the control cycle.

In step S36, the position information acquisition module 344 acquires information on the current position of the multi-axis robot 10 from the first controller 100 via the first communication module 320, and information on the current position of the peripheral device 20 from the second controller 200 via the second communication module 330.

In step S37, the mode switching module 345 checks whether the current position of the multi-axis robot 10 and the current position of the peripheral device 20 agree with the switching start positions from the synchronous control mode to the normal control mode. That is, the mode switching module 345 checks whether the current position of the multi-axis robot 10 matches the first operation command, and the current position of the peripheral device 20 matches the second operation command. Note that "match" here includes a state in which a difference of a tolerance level (negligible level) remains.

In response to determining in step S37 that the current position of the multi-axis robot 10 and the current position of the peripheral device 20 do not agree with the switching start positions from the synchronous control mode to the normal control mode, the process proceeds to step S38, and the first operation command output module 342 outputs the first operation command to the first controller 100 via the first communication module 320, and the second operation command output module 343 outputs the second operation command to the second controller 200 via the second communication module 330.

In step S39, the mode switching module 345 waits for the elapse of the control cycle. Thereafter, the third controller 300 returns the process to step S36. Thereafter, until the current position of the multi-axis robot 10 and the current position of the peripheral device 20 agree with the switching start positions from the synchronous control mode to the normal control mode, the output of the constant operation command is repeated.

In response to determining in step S37 that the current position of the multi-axis robot 10 and the current position of the peripheral device 20 agree with the switching start positions from the synchronous control mode to the normal control mode, the process proceeds to step S40. Step S40 includes second transition processing for shifting the synchronous control mode to the normal control mode.

Figure 6:
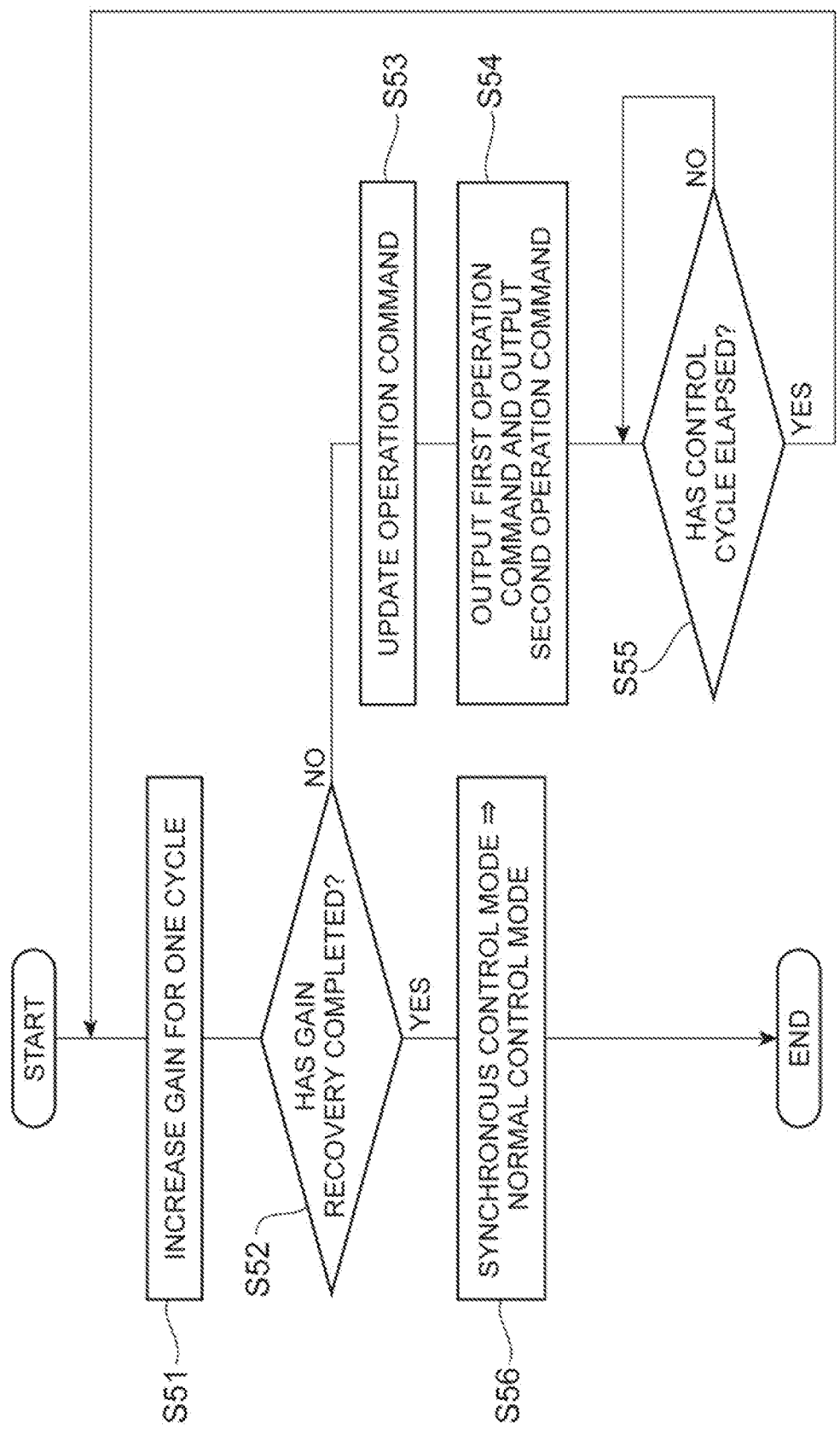
FIG. 6 is a flowchart showing an example second transition processing procedure.

FIG. 6 is a flowchart showing the second transition processing procedure. In some example embodiments, the third controller 300 may be configured to sequentially execute some or all of the steps illustrated in FIG. 6 and as further described below. Whereas some of the steps may additionally be described as being executed by one or more "modules," in some example embodiments some or all of the steps may be performed by one or more processing devices and/or hardware devices, and as further described above with respect to the example hardware configuration illustrated in FIG. 2. In step S51, the gain adjustment module 347 outputs a command to increase the second gain with an increasing pitch for one cycle or an increasing rate for one cycle to the second controller 200 via the second communication module 330. The increasing pitch for one cycle is the same as the decreasing pitch for one cycle described above. The increasing rate for one cycle is the reciprocal of the decreasing rate for one cycle described above.

In step S52, the gain adjustment module 347 checks whether the second gain has returned to a value before the decrease.

In response to determining in step S52 that the second gain does not return to the value before the decrease, the process proceeds to step S53, and the command generation module 341 generates the first operation command and the second operation command in the current control cycle based on the motion information stored in the motion storage module 310.

In step S54, the first operation command output module 342 outputs the first operation command generated by the command generation module 341 to the first controller 100 via the first communication module 320, and the second operation command output module 343 outputs the second operation command generated by the command generation module 341 to the second controller 200 via the second communication module 330.

In step S55, the command generation module 341 waits for the elapse of the control cycle. Thereafter, the third controller 300 returns the process to step S51. Thereafter, until the increase in the second gain is completed (until the second gain returns to a value before the decrease), increasing the second gain with the increasing pitch for one cycle or the increasing rate for one cycle, and updating and outputting of the operation command are repeated. Increasing the second gain with the increasing pitch for one cycle or the increasing rate for one cycle is repeated, whereby the second gain gradually increases. As exemplified herein, gradually increasing includes increasing in stages with multiple iterations.

In response to determining in step S52 that the second gain returns to the value before the decrease, the process proceeds to step S56, and the mode switching module 345 switches the synchronous control mode to the normal control mode. This concludes the second transition processing.

In accordance with one or more example embodiments, the control system 1 includes the first controller 100 configured to control the first controlled object with the first gain, the second controller 200 configured to control the second controlled object having higher responsiveness than the first controlled object with the second gain, and the third controller 300 configured to operate the first controlled object via the first controller 100 and configured to operate the second controlled object via the second controller 200. In some example embodiments, the third controller 300 includes the first communication module 320 configured to input and output information to and from the first controller 100, the second communication module 330 configured to input and output information to and from the second controller 200, and the control processing module 340 configured to output the first operation command for operating the first controlled object to the first controller 100 via the first communication module 320, configured to output the second operation command for operating the second controlled object to the second controller 200 via the second communication module 330, configured to switch a mode between a normal control mode and a synchronous control mode, and configured to output, to the second controller 200 via the second communication module 330, a command to decrease the second gain during at least part of a period of the synchronous control mode as compared with the normal control mode.

In some example embodiments of the control system 1, the control gain of the second controlled object decreases during at least part of the period of the synchronous control mode, so that the responsiveness of the second controlled object approaches the responsiveness of the first controlled object. Therefore, the shift of the operation timings between the operation of the first controlled object and the operation of the second controlled object can be effectively decreased.

In some example embodiments, the control processing module 340 may further be configured to acquire information on the current position of the first controlled object from the first controller 100 via the first communication module 320, and configured to acquire information on the current position of the second controlled object from the second controller 200 via the second communication module 330. Switching a mode between the normal control mode and the synchronous control mode may include switching the normal control mode to the synchronous control mode when both the current position of the first controlled object and the current position of the second controlled object satisfy a switching condition, and outputting, to the second controller 200, a command to decrease the second gain during at least part of a period of the synchronous control mode as compared with the normal control mode may include outputting to the second controller 200 a command to decrease the second gain in synchronization with switching of the normal control mode to the synchronous control mode. In this case, appropriate setting of the switching condition makes it possible to switch the normal control mode to the synchronous control mode when there is no shift in the operation timings of the first controlled object and the second controlled object. Further, decreasing the second gain in synchronization with switching of the normal control mode to the synchronous control mode makes it possible to suppress an increase in the shift of the operation timing after the start of the synchronous control mode. Therefore, the shift of the operation timings between the operation of the first controlled object and the operation of the second controlled object can be further effectively decreased.

In some example embodiments, outputting to the second controller 200 a command to decrease the second gain in synchronization with switching of the normal control mode to the synchronous control mode may include outputting to the second controller a command to gradually decrease the second gain 200 as the current position of the second controlled object approaches the position satisfying the switching condition, and completing the output of the command to decrease the second gain when or before the current position of the second controlled object reaches the position satisfying the switching condition. In this case, gradually decreasing the second gain makes it possible to alleviate sudden acceleration/deceleration that occurs to the second controlled object with the change in the gain. In addition, completing the decrease in the second gain before the current position of the second controlled object reaches the position satisfying the switching condition makes it possible to more reliably suppress the increase in the shift of the operation timing after the start of the synchronous control mode. Therefore, the shift of the operation timings between the operation of the first controlled object and the operation of the second controlled object can be further effectively decreased.

In some example embodiments, the control processing module 340 may further be configured to acquire information indicating the first gain from the first controller 100 via the first communication module 320, and configured to set a degree of the decrease in the second gain based on the first gain, and outputting a command to decrease the second gain to the second controller 200 may include outputting to the second controller 200 a command to decrease the second gain according to the degree of the decrease. In this case, setting a degree of the decrease in the second gain in the synchronous control mode based on the first gain makes it possible to more reliably make the responsiveness of the second controlled object close to the responsiveness of the first controlled object. Therefore, the shift of the operation timings between the operation of the first controlled object and the operation of the second controlled object can be further effectively decreased.

In some example embodiments, the first controlled object may be the multi-axis robot 10 having a plurality of joint axes, and the second controlled object may be the peripheral device 20 operable in cooperation with the multi-axis robot 10. In facilities including multi-axis robots, differences in responsiveness tend to increase between the multi-axis robot and its peripheral devices. Therefore, setting the multi-axis robot 10 as the first controlled object and setting the peripheral device 20 as the second controlled object makes it possible to more effectively reduce the shift of the operation timings of the first controlled object and the second controlled object.

In some example embodiments, the machine controller (third controller 300) and the robot controller (first controller 100) have a master to servant relationship, for example where the first controlled object is the multi-axis robot 10, and the second controlled object is the peripheral device 20. In this case, since the high order arithmetic unit for executing cooperative control and the like can be dedicated for the machine controller and the function of the robot controller can specialize in controlling the multi-axis robot 10, the robot controller can be simplified. In addition, since it is possible to control the robot controller via the machine controller, it is possible to solve some complications with respect to the separate use between the programming language for the machine controller and the programming language for the robot controller. Therefore, the embodiments of the present invention are also effective in simplifying the configuration of the control system as a whole and improving its usability.

Although the embodiments have been described above, the present invention is not necessarily limited to the above-described embodiments, and various modifications may be made without departing from the scope of the invention.

Indeed, the novel devices, systems and methods described herein may be embodied in a variety of other forms; furthermore, various omissions, substitutions and changes in the form of the devices, systems and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Regarding the above embodiments, the following appendices are appended.

APPENDIX 1

A control system comprising:

a first controller configured to control a first controlled object with a first gain;

a second controller configured to control a second controlled object having higher responsiveness than the first controlled object with a second gain; and a third controller configured to operate the first controlled object via the first controller and operate the second controlled object via the second controller, wherein the third controller includes:

a first communication module configured to input and output information to and from the first controller, a second communication module configured to input and output information to and from the second controller, and a control processing module configured to:

output a first operation command for operating the first controlled object to the first controller via the first communication module, output a second operation command for operating the second controlled object to the second controller via the second communication module, switch a mode between a normal control mode and a synchronous control mode, and output, to the second controller via the second communication module, a command to decrease the second gain during at least part of a period of the synchronous control mode as compared with the normal control mode.

APPENDIX 2

The control system according to appendix 1,
wherein the control processing module is further configured to:
  acquire information on a current position of the first controlled object from the first controller via the first communication module, and
  acquire information on a current position of the second controlled object from the second controller via the second communication module,
wherein switching the mode between the normal control mode and the synchronous control mode comprises switching the normal control mode to the synchronous control mode when both the current position of the first controlled object and the current position of the second controlled object satisfy a switching condition, and
wherein outputting to the second controller the command to decrease the second gain during the at least part of the period of the synchronous control mode as compared with the normal control mode includes outputting to the second controller a command to decrease the second gain in synchronization with switching of the normal control mode to the synchronous control mode.

APPENDIX 3

The control system according to appendix 2, wherein outputting to the second controller the command to decrease the second gain in synchronization with switching of the normal control mode to the synchronous control mode includes outputting to the second controller a command to gradually decrease the second gain as the current position of the second controlled object approaches a position satisfying the switching condition, and completing the output of the command to decrease the second gain when or before the current position of the second controlled object reaches the position satisfying the switching condition.

APPENDIX 4

The control system according to any one of appendices 1 to 3,
wherein the control processing module is further configured to acquire information indicating the first gain from the first controller via the first communication module, and configured to set a degree of the decrease in the second gain based on the first gain, and
wherein outputting the command to decrease the second gain to the second controller includes outputting to the second controller a command to decrease the second gain according to the degree of the decrease.

APPENDIX 5

The control system according to any one of appendices 1 to 4, wherein the first controlled object is a multi-axis robot having a plurality of joint axes, and the second controlled object is a peripheral device that is cooperatively operable with the multi-axis robot.

APPENDIX 6

A controller comprising:
  a first communication module configured to input and output information to and from a first controller that controls a first controlled object with a first gain;
  a second communication module configured to input and output information to and from a second controller that controls a second controlled object having higher responsiveness than the first controlled object with a second gain; and
  a control processing module configured to:
    output a first operation command for operating the first controlled object to the first controller via the first communication module,
    output a second operation command for operating the second controlled object to the second controller via the second communication module,
    switch a mode between a normal control mode and a synchronous control mode, and
    output, to the second controller via the second communication module, a command to decrease the second gain during at least part of a period of the synchronous control mode as compared with the normal control mode.

APPENDIX 7

The controller according to appendix 6,
wherein the control processing module is further configured to:
  acquire information on a current position of the first controlled object from the first controller via the first communication module, and
  acquire information on a current position of the second controlled object from the second controller via the second communication module,
wherein switching a mode between the normal control mode and the synchronous control mode includes switching the normal control mode to the synchronous control mode when both the current position of the first controlled object and the current position of the second controlled object satisfy a switching condition, and
wherein outputting to the second controller the command to decrease the second gain during the at least part of the period of the synchronous control mode as compared with the normal control mode includes outputting to the second controller a command to decrease the second gain in synchronization with switching of the normal control mode to the synchronous control mode.

APPENDIX 8

The controller according to appendix 7, wherein outputting to the second controller the command to decrease the second gain in synchronization with switching of the normal control mode to the synchronous control mode includes outputting to the second controller a command to gradually decrease the second gain as the current position of the second controlled object approaches a position satisfying the switching condition, and completing the output of the command to decrease the second gain when or before the current position of the second controlled object reaches the position satisfying the switching condition.

APPENDIX 9

The controller according to any one of appendices 6 to 8, wherein the control processing module is further configured to acquire information indicating the first gain from the first controller via the first communication module, and configured to set a degree of the decrease in the second gain based on the first gain, and wherein outputting the command to decrease the second gain to the second controller includes outputting to the second controller a command to decrease the second gain according to the degree of the decrease.

APPENDIX 10

The controller according to any one of appendices 6 to 9, wherein the first controlled object is a multi-axis robot having a plurality of joint axes, and the second controlled object is a peripheral device that is cooperatively operable with the multi-axis robot.

APPENDIX 11

A control method performed by a third controller configured to operate a first controlled object via a first controller that controls the first controlled object with a first gain, and configured to operate a second controlled object via a second controller that controls the second controlled object having higher responsiveness than the first controlled object with a second gain, the control method comprising:

outputting a first operation command for operating the first controlled object to the first controller, outputting a second operation command for operating the second controlled object to the second controller, switching a mode between a normal control mode and a synchronous control mode, and outputting to the second controller a command to decrease the second gain during at least part of a period of the synchronous control mode as compared with the normal control mode.

APPENDIX 12

The control method according to appendix 11, further comprising:

by the third controller, acquiring information on a current position of the first controlled object from the first controller, and acquiring information on a current position of the second controlled object from the second controller, wherein switching a mode between the normal control mode and the synchronous control mode includes switching the normal control mode to the synchronous control mode when both the current position of the first controlled object and the current position of the second controlled object satisfy a switching condition, and wherein outputting to the second controller the command to decrease the second gain during the at least part of the period of the synchronous control mode as compared with the normal control mode includes outputting to the second controller a command to decrease the second gain in synchronization with switching of the normal control mode to the synchronous control mode.

APPENDIX 13

The control method according to appendices 12, wherein outputting to the second controller the command to decrease the second gain in synchronization with switching of the normal control mode to the synchronous control mode includes outputting to the second controller a command to gradually decrease the second gain as the current position of the second controlled object approaches a position satisfying the switching condition, and completing the output of the command to decrease the second gain when or before the current position of the second controlled object reaches the position satisfying the switching condition.

APPENDIX 14

The control method according to any one of appendices 11 to 13, further comprising:

by the third controller, acquiring information indicating the first gain from the first controller, and setting a degree of the decrease in the second gain based on the first gain, wherein outputting the command to decrease the second gain to the second controller includes outputting to the second controller a command to decrease the second gain according to the degree of the decrease.

APPENDIX 15

The control method according to any one of appendices 11 to 14, wherein the first controlled object is a multi-axis robot having a plurality of joint axes, and the second controlled object is a peripheral device that operates in cooperation with the multi-axis robot.

What is claimed is:

1. A controller comprising:
a first communication device configured to input and output information to and from a first controller that controls a first controlled object with a first gain, wherein the first controlled object is associated with a first timing characteristic;
a second communication device configured to input and output information to and from a second controller that controls a second controlled object with a second gain, wherein the second controlled object is associated with a second timing characteristic that is different from the first timing characteristic which creates a timing offset; and
a processing device configured to:
output a first operation command to the first controller via the first communication device in order to operate the first controlled object,
output a second operation command to the second controller via the second communication device in order to operate the second controlled object,
switch a mode between a normal control mode associated with a normal mode gain, and a synchronous control mode associated with a synchronous mode gain that is lower than the normal mode gain, and
output, to the second controller via the second communication device, a gain adjustment command to set the second gain to the synchronous mode gain during at least part of a period of the synchronous control mode, in order to correct the timing offset.

2. The controller according to claim 1,
wherein the processing device is further configured to:
acquire information on a current position of the first controlled object from the first controller via the first communication device, and
acquire information on a current position of the second controlled object from the second controller via the second communication device,
wherein switching the mode comprises switching the mode from the normal control mode to the synchronous control mode when both the current position of the first controlled object and the current position of the second controlled object satisfy a first switching condition, and
wherein the gain adjustment command to be outputted to the second controller comprises a command to decrease the second gain in accordance with a timing at which the processing device switches the mode from the normal control mode to the synchronous control mode.

3. The controller according to claim 2, wherein the processing device is further configured to maintain the first operation command and the second operation command constant until both the current position of the first controlled object and the current position of the second controlled object satisfy the first switching condition.

4. The controller according to claim 3, wherein the processing device is configured to repeat outputting the first operation command to the first controller and outputting the second operation command to the second controller during a control cycle,
wherein the first operation command comprises a first positioning value and the second operation command comprises a second positioning value, and
wherein maintaining the first operation command and second operation command constant comprises repeating the outputting of the first operation command with the first positioning value and repeating the outputting of the second operation command with the second positioning value.

5. The controller according to claim 2, wherein the gain adjustment command to be outputted to the second controller comprises a gradual decrease command to gradually decrease the second gain as the current position of the second controlled object approaches a position satisfying the first switching condition, wherein the output of the gradual decrease command is completed when or before the current position of the second controlled object reaches the position satisfying the first switching condition.

6. The controller according to claim 5, wherein the processing device is configured to repeat outputting the first operation command to the first controller and outputting the second operation command to the second controller during a control cycle, and
wherein outputting to the second controller the gradual decrease command comprises a command to repeatedly decrease the second gain at a predetermined decreasing rate.

7. The controller according to claim 6, wherein the decreasing rate is preset in order for the second gain to achieve the synchronous mode gain when or before the current position of the second controlled object reaches a position satisfying the first switching condition.

8. The controller according to claim 1,
wherein the processing device is further configured to acquire information indicating the first gain from the first controller via the first communication device, and configured to set the synchronous mode gain based on the first gain.

9. The controller according to claim 8, wherein setting the synchronous mode gain comprises setting the synchronous mode gain to a value equal to or less than the first gain.

10. The controller according to claim 2, wherein switching the mode comprises switching the mode from the synchronous control mode to the normal control mode when both the current position of the first controlled object and the current position of the second controlled object satisfy a second switching condition, and
wherein the gain adjustment command to be outputted to the second controller comprises a command to increase the second gain in accordance with a timing at which the processing device switches the mode from the synchronous control mode to the normal control mode.

11. The controller according to claim 10, wherein the processing device is further configured to maintain the first operation command and the second operation command until both the current position of the first controlled object and the current position of the second controlled object satisfy the second switching condition.

12. The controller according to claim 10, wherein the gain adjustment command to be outputted to the second controller comprises a gradual increase command to gradually increase the second gain when or after both the current position of the first controlled object and the current position of the second controlled object satisfy the second switching condition.

13. The controller according to claim 10, wherein the processing device is configured to perform the switching of the mode from the synchronous control mode to the normal control mode after the second gain reaches the normal mode gain.

14. The controller according to claim 1, wherein the first controlled object comprises a multi-axis robot having a plurality of joint axes, and the second controlled object comprises a peripheral device that is cooperatively operable with the multi-axis robot.

15. The controller according to claim 14, wherein the peripheral device comprises a number of motion axes, and
wherein the number of the motion axes of the peripheral device is smaller than the number of the joint axes of the multi-axis robot.

16. The controller according to claim 14, wherein the first operation command comprises numerical data setting a positional target value of a tip portion of the multi-axis robot.

17. The controller according to claim 15, wherein the second operation command comprises numerical value setting a motion target value of an actuator of the motion axis.

18. A control system comprising:
the controller that includes the first communication device, the second communication device, and the processing device according to claim 1;
the first controller to input and output information to and from the first communication device; and
the second controller to input and output information to and from the second communication device.

19. A non-transitory memory device having instructions stored thereon that, in response to execution by a controller, cause the controller to perform operations comprising:
outputting a first operation command to a first controller configured to control a first controlled object with a first gain, wherein the first controlled object is associated with a first timing characteristic,
outputting a second operation command to a second controller configured to control a second controlled object with a second gain, wherein the second controlled object is associated with a second timing characteristic that is different from the first timing characteristic which creates a timing offset, switching a mode between a normal control mode associated with a normal mode gain, and a synchronous control mode associated with a synchronous mode gain that is lower than the normal mode gain, and outputting to the second controller a gain adjustment command to set the second gain to the synchronous mode gain during at least part of a period of the synchronous control mode, in order to correct the timing offset.

20. A control method comprising:

outputting a first operation command to a first controller configured to control a first controlled object with a first gain, wherein the first controlled object is associated with a first timing characteristic, outputting a second operation command to a second controller configured to control a second controlled object with a second gain, wherein the second controlled object is associated with a second timing characteristic that is different from the first timing characteristic which creates a timing offset, switching a mode between a normal control mode associated with a normal mode gain, and a synchronous control mode associated with a synchronous mode gain that is lower than the normal mode gain, and outputting to the second controller a gain adjustment command to set the second gain to the synchronous mode gain during at least part of a period of the synchronous control mode, in order to correct the timing offset.

* * * * *